United States Patent
Liu et al.

(10) Patent No.: US 8,414,794 B2
(45) Date of Patent: Apr. 9, 2013

(54) BLUE PHASE LIQUID CRYSTAL COMPOSITION AND METHOD FOR FORMING BLUE PHASE LIQUID CRYSTAL

(75) Inventors: Hsin-Hung Liu, Taichung (TW); Hui-Yu Chen, Taichung (TW); Ji-Yi Chou, Taichung (TW); Jia-Liang Lai, Changhua County (TW); Yu-Hsien Chen, Kaohsiung (TW); Huai-An Li, Taoyuan County (TW)

(73) Assignees: Feng Chia University, Seatwen, Taichung (TW); Chunghwa Picture Tubes, Ltd., Bade, Taoyuan (TW)

( * ) Notice: Subject to any disclaimer, the term of this patent is extended or adjusted under 35 U.S.C. 154(b) by 0 days.

(21) Appl. No.: 13/288,045

(22) Filed: Nov. 3, 2011

(65) Prior Publication Data

US 2012/0273721 A1 Nov. 1, 2012

(30) Foreign Application Priority Data

Apr. 28, 2011 (TW) .............................. 100114851 A

(51) Int. Cl.
*C09K 19/00* (2006.01)
*C09K 19/06* (2006.01)
*C09K 19/52* (2006.01)

(52) U.S. Cl.
USPC ..................... 252/299.01; 252/299.6; 428/1.1

(58) Field of Classification Search ............. 252/299.01, 252/299.6; 428/1.1
See application file for complete search history.

(56) References Cited

U.S. PATENT DOCUMENTS

| 5,698,136 A * | 12/1997 | Miyazawa et al. ......... 252/299.6 |
| 7,803,436 B2 | 9/2010 | Hattori et al. |
| 2009/0268150 A1 | 10/2009 | Hattori et al. |
| 2011/0075073 A1 * | 3/2011 | Oiwa et al. ....................... 349/76 |

FOREIGN PATENT DOCUMENTS

TW I331233 10/2010

OTHER PUBLICATIONS

"The influence of pretransitional phenomena on blue phase range", Liquid Crystals 1993, vol. 14. No. 6. 2001-2011, Miller.

* cited by examiner

*Primary Examiner* — Geraldina Visconti
(74) *Attorney, Agent, or Firm* — Winston Hsu; Scott Margo

(57) ABSTRACT

A blue phase liquid crystal composition includes a chiral dopant, a positive liquid crystal component and a negative liquid crystal component. The positive liquid crystal component includes at least one positive liquid crystal material, has a positive dielectric anisotropy and has no blue phase properties with respect to the chiral dopant. In addition, the negative liquid crystal component includes at least one negative liquid crystal material, has a negative dielectric anisotropy and has no blue phase properties with respect to the chiral dopant, so that the blue phase liquid crystal composition has a dielectric anisotropy between 0.5 and 14 and a blue phase temperature range larger than 3° C.

10 Claims, 2 Drawing Sheets

BLUE PHASE LIQUID CRYSTAL COMPOSITION AND METHOD FOR FORMING BLUE PHASE LIQUID CRYSTAL

BACKGROUND OF THE INVENTION

1. Field of the Invention

The present invention generally relates to a blue phase liquid crystal composition and a method for forming the blue phase liquid crystal composition. In particular, the present invention is directed to a blue phase liquid crystal composition with an induced blue phase property by properly blending a positive liquid crystal component and a negative liquid crystal component which both have no blue phase properties with respect to a certain chiral dopant. The chiral dopant is added to the liquid crystal blend to induce the blue phase property of the liquid crystal blend. A method is also disclosed for obtaining a blue phase liquid crystal composition with a blue phase property by properly blending a positive liquid crystal component and a negative liquid crystal component which have no blue phase properties with respect to a certain chiral dopant and by the addition of the chiral dopant.

2. Description of the Prior Art

A blue phase (BP) liquid crystal has a three dimensional photonic crystal structure. This liquid crystal phase usually exists between an isotropic phase and a cholesteric phase. A pile of molecular layers of the blue phase liquid crystal may form various stacking arrangements, such as blue phase 1 (BP1), blue phase 2 (BP2) or blue phase 3 (BP3) stacking arrangements such as body center cubic, simple cubic, and iso-like. Because light tends to have a shorter wavelength after Bragg diffraction in the molecular lattice, a bluish or purplish tone of mosaic texture can be generally observed, so the liquid crystal is named accordingly.

The most welcome feature of the blue phase liquid crystal material is the extreme short response time in the presence of an electric field. The liquid crystal display made of the blue phase liquid crystal material therefore has a super fast response, in the order of several hundred microseconds. Initially, the blue phase temperature range of the blue phase material was too narrow (around 1-2° C.) to be practicable, and this has continued to be the major applicable problem for the blue phase liquid crystal material. After years of study, however, it was found that the blue phase temperature range of the blue phase material may be enlarged to be in the order of tens of degrees (>60° C.) when blended reactive monomers of different ratios are photo-polymerized in the temperature range of the blue phase, theoretically temporarily solving the problem of a too-narrow blue phase temperature range of the blue phase material.

A liquid crystal display has a top polarizer and a bottom polarizer disposed in a way normal to each other (the axes are 90° to each other) so that no light is able to pass through. A blue phase liquid crystal material is able to change from a state of no birefringence to another state of birefringence, which is called the Kerr Effect. This is the reason why a blue phase liquid crystal material has a bright-dark (grayscale) appearance.

So far there are two major problems for the blue phase liquid crystal material. The blue phase temperature range of the blue phase material is still considered too narrow. Although certain blue phase liquid crystals of wide blue phase temperature range have been proposed, they are obtainable only by polymerization in an extremely narrow blue phase temperature range. It is difficult to precisely control the operations in such a narrow temperature range (within a few ° K) in the industrial field. Additionally, a very high drive voltage (more than 100 V) is needed, which is not beneficial for the design of the entire liquid crystal display hardware.

R. J. Miller and H. F. Gleeson (Liq. Cryst. 14, 2001 (1993)) have disclosed that six liquid crystals of blue phase property were obtained from six different liquid crystals with the addition of the same proportion of a chiral dopant. The resultant blue phase temperature range is 0.2° C. to 1° C., however, which is still too narrow.

In light of the fact that current formulation of the blue phase liquid crystals and the adjustments of the operating temperature were mainly based on empirical try-and-error methods, no universal principles exist to synthesize or formulate liquid crystals with blue phase property. The current solutions rely on trying every possible combination or wasting large quantities of materials for blending in search of a suitable formula. This approach costs a lot of time and money and decelerates the developments of the liquid crystal panel.

As a result, there is still a need to quickly formulate a blue phase liquid crystal composition of a wide temperature range with the liquid crystal materials of specific physical properties at hand or to obtain a liquid crystal composition of blue phase property from suitably blending a positive liquid crystal component and a negative liquid crystal component, wherein both components originally have no blue phase properties with respect to a certain chiral dopant and by the introduction of the chiral dopant.

SUMMARY OF THE INVENTION

The present invention in a first aspect proposes a blue phase liquid crystal composition with a wide blue phase temperature range. The blue phase liquid crystal composition of the present invention includes a chiral dopant and a liquid crystal blend. The liquid crystal blend includes a positive liquid crystal component and a negative liquid crystal component. The positive liquid crystal component not only includes at least one positive liquid crystal material but also has a positive dielectric anisotropy. The positive liquid crystal component has no blue phase properties with respect to the chiral dopant. In addition, the negative liquid crystal component not only includes at least one negative liquid crystal material but also has a negative dielectric anisotropy. Similarly, the negative liquid crystal component has no blue phase properties with respect to the chiral dopant. The blue phase liquid crystal composition of the present invention has a dielectric anisotropy between 0.5 and 14 and a blue phase temperature range larger than 3° C.

The present invention in another aspect also proposes a method for forming a blue phase liquid crystal composition with an induced blue phase property by properly blending a positive liquid crystal component and a negative liquid crystal component which both originally have no blue phase properties with respect to a certain chiral dopant and later by adding the chiral dopant to the liquid crystal blend to induce the blue phase property of the liquid crystal blend. First, a positive liquid crystal component is provided. The positive liquid crystal component not only includes at least one positive liquid crystal material but also has a positive dielectric anisotropy. The positive liquid crystal component has no blue phase properties with respect to the chiral dopant. Second, a negative liquid crystal component is provided. The negative liquid crystal component not only includes at least one negative liquid crystal material but also has a negative dielectric anisotropy. In addition, the negative liquid crystal component has no blue phase properties with respect to the chiral dopant. The positive liquid crystal component and the negative liquid crystal component are properly blended to form a liquid crystal blend so that the liquid crystal blend has a dielectric anisotropy between 0.5 and 14. The chiral dopant is then added to the liquid crystal blend so as to obtain a blue phase liquid crystal composition; the resultant blue phase liquid crystal composition has a blue phase temperature range larger than 3° C.

One of the features of the present invention is that the blue phase liquid crystal composition with a wide blue phase temperature range is quickly obtained from the known physical properties of commercially available liquid crystals. Furthermore, some principles are proposed as a guidance to suitably choose liquid crystals to obtain a blue phase liquid crystal composition with a blue phase property by properly blending a positive liquid crystal component and a negative liquid crystal component in which both components originally have no blue phase properties with respect to a certain chiral dopant and by the induction of the chiral dopant. The method of the present invention solves the problems of the current formulation of the blue phase liquid crystals and the adjustments of the operating temperature mainly based on repeated empirical try-and-error without a practical guide. The approach of the present invention does not rely on trying every possible combination or wasting large quantities of materials for blending in search of a suitable formula. This approach can save a lot of time and money as well as accelerating the developments of the liquid crystal panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
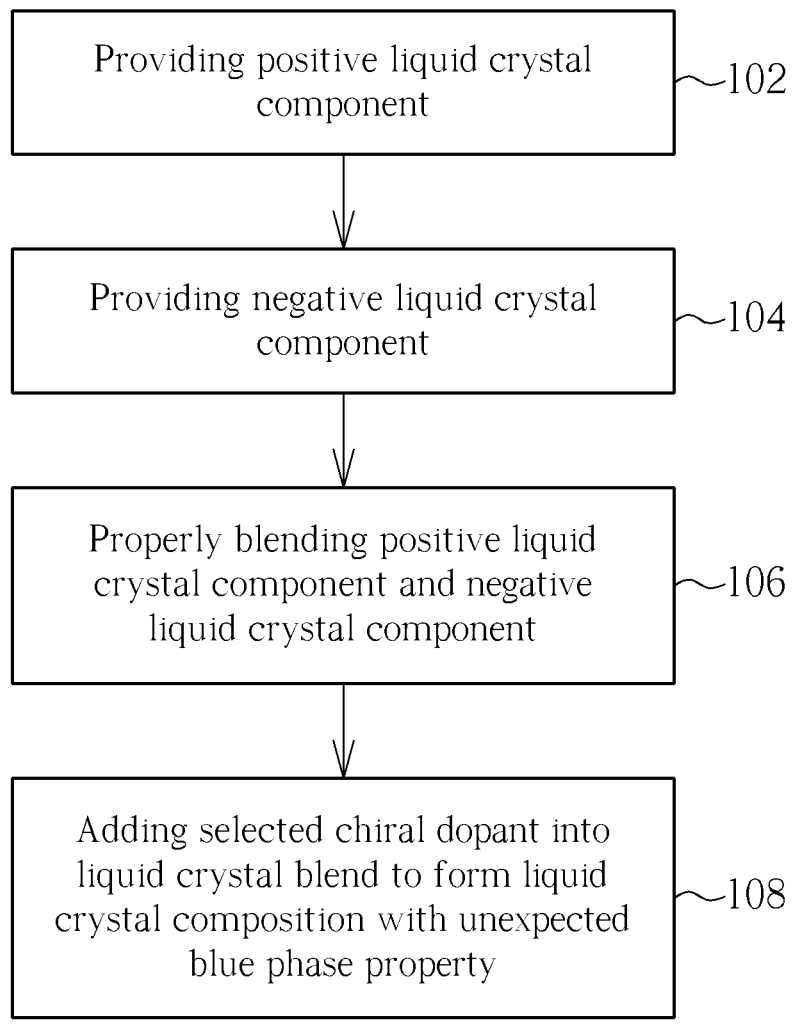
FIG. 1 illustrates the steps for forming a blue phase liquid crystal composition according to an exemplary embodiment of the present invention.

The present invention in one aspect provides a method for obtaining a blue phase liquid crystal composition from liquid crystal components which originally have no blue phase properties with respect to a certain chiral dopant. FIG. 1 illustrates the steps for forming a blue phase liquid crystal composition of the present invention. Please refer to FIG. 1. First a positive liquid crystal component (step 102) and a negative liquid crystal component (step 104) are provided. The positive liquid crystal component and the negative liquid crystal component both have no blue phase properties with respect to a certain chiral dopant to be used. The positive liquid crystal component has a positive dielectric anisotropy. The positive liquid crystal component may have a positive dielectric anisotropy greater than +5. Further, the positive liquid crystal component may include only a single positive liquid crystal or multiple positive liquid crystals, such as the commercially available positive liquid crystal products, so the positive liquid crystal component may include at least one positive liquid crystal material.

Similarly, the negative liquid crystal component has a negative dielectric anisotropy. The negative liquid crystal component may have a negative dielectric anisotropy less than −4. Such negative liquid crystal component may also include only a single negative liquid crystal or multiple negative liquid crystals, such as the commercially available negative liquid crystal products, so the negative liquid crystal component may include at least one negative liquid crystal material. The following are some examples of the names of some common commercially available liquid crystal materials: E7, K15, EBBA, MBBA, ZLI4792, MLC 2608, LCT-07-1710 and MJ051989.

Table 1 shows some dielectric anisotropy values of the common commercially available liquid crystal materials.

TABLE 1

| Liquid Crystal Materials | Source | Dielectric Anisotropy |
| --- | --- | --- |
| K15 | Merk | 11.2 |
| E7 | Merk | 14.2 |
| EBBA | Adrich | −3.07 |
| MBBA | Adrich | −3.7 |
| ZLI4792 | Merk | −4.19 |
| MLC 2608 | Merk | 4.8 |
| LCT-07-1710 | Merk | 8.8 |
| MJ051989 | Merk | −5.1 |

As shown in FIG. 1, the positive liquid crystal component and the negative liquid crystal component are properly blended (step 106) to form a liquid crystal blend. The properties of the liquid crystal materials of the positive liquid crystal component and the negative liquid crystal component, such as the dielectric anisotropy and ratios, are taken into consideration so that the resultant liquid crystal blend has a dielectric anisotropy between 0.5 and 14. Preferably, the resultant liquid crystal blend has a dielectric anisotropy as close to 0 as possible but the dielectric anisotropy of the resultant liquid crystal blend is never equal to 0. The following formula may be used to predict the dielectric anisotropy of the resultant liquid crystal blend:

$$\Delta\varepsilon_{blend} = A\Delta\varepsilon_1 + (1-A)\Delta\varepsilon_2$$

wherein $\Delta\varepsilon_{blend}$ is the dielectric anisotropy of said liquid blend;

$\Delta\varepsilon_1$ is the dielectric anisotropy of the positive liquid crystal component;

$\Delta\varepsilon_2$ is the dielectric anisotropy of the negative liquid crystal component; and A is the weight percentage.

Table II shows the resultant compositions of some exemplary liquid crystal blends.

TABLE II

| Item | Liquid Crystal Blend | Ratio |
| --- | --- | --- |
| 1)* | LC-1 | K15:E7:ZLI4572(22:66:12) |
|  | LC-2 | K15:E7:ZLI 4572(29.3:58.6:12) |
|  | LC-3 | K15:E7:ZLI 4572(44:44:12) |
|  | LC-4 | K15:E7:ZLI 4572(58.6:29.3:12) |
|  | LC-5 | K15:E7:ZLI 4572(22:66:12) |
| 2)* | LC-6 | K15:LCM02:ZLI 4572(58.6:29.3:12) |
|  | LC-7 | K15:LCM02:ZLI 4572(44:44:12) |
|  | LC-8 | K15:LCM02:ZLI 4572(29.3:58.6:12) |
|  | LC-49 | K15:LCM07:ZLI 4572(29.3:58.6:12) |
|  | LC-54 | K15:LCM07:ZLI 4572(58.6:29.3:12) |
|  | LC-55 | K15:LCM07:ZLI 4572(66:22:12) |
|  | LC-60 | LCM06:LCM07:ZLI 4572(31.4:56.6:12) |
|  | LC-50 | K15:LCM07:ZLI 4572(22:66:12) |
| 3)* | LC-39 | K15:LCM05:ZLI 4572(22:66:12) |
|  | LC-40 | K15:LCM05:ZLI 4572(29.3:58.6:12) |
|  | LC-41 | K15:LCM05:ZLI 4572(44:44:12) |
|  | LC-42 | K15:LCM05(58.6:29.3:12) |

TABLE II-continued

| Item | Liquid Crystal Blend | Ratio |
|---|---|---|
|  | LC-43 | K15:LCM05:ZLI 4572(66:22:12) |
| Single Liquid Crystal | K15 | K15 |
|  | E7 | E7 |
|  | LCM02 | LCM02 |
|  | LCM03 | LCM03 |
|  | LCM04 | LCM04 |
|  | LCM05 | LCM05 |
|  | LCM06 | LCM06 |
|  | LCM07 | LCM07 |

Remarks:
1) Blend of positive liquid crystal component of high dielectric anisotropy and negative liquid crystal component of high dielectric anisotropy.
2) Blend of positive liquid crystal component of high dielectric anisotropy and negative liquid crystal component of low dielectric anisotropy.
3) Blend of positive liquid crystal component of low dielectric anisotropy and negative liquid crystal component of high dielectric anisotropy.

As shown in FIG. 1, a selected chiral dopant is added into the liquid crystal blends to form a liquid crystal composition with an unexpected blue phase property (step 108). A suitable chiral dopant may be a chiral molecule. There are commercially available products of chiral dopant: ZLI 4572 from Merck, S811 from Uni-Onmard Corp. or R811 from Uni-Onmard Corp. The weight ratio of the chiral product ZLI 4572 may be 12%, and the weight ratio of S811 or R811 may be 25% to 35%. The selected chiral dopant is capable of inducing the liquid crystal composition to generate a blue phase. For example, the resultant blue phase liquid crystal composition has a blue phase temperature range larger than 3° C., or has a blue phase temperature range less than 10° C.

Table III shows the resultant corresponding dielectric anisotropy values of the exemplary liquid crystal blends.

TABLE III

| Type | Liquid Crystal Blends | Dielectric Anisotropy |
|---|---|---|
| 1)* (positive) | LC-1 | 13.6 |
|  | LC-2 | 13.5 |
|  | LC-3 | 12.5 |
|  | LC-4 | 12.2 |
|  | LC-5 | 12.1 |
| 2)* (negative) | LC-6 | 9.58 |
|  | LC-7 | 7.81 |
|  | LC-8 | 5.86 |
|  | LC-49 | 4.94 |
|  | LC-54 | 9.02 |
|  | LC-55 | 9.46 |
|  | LC-60 | 0.61 |
|  | LC-50 | 3.43 |
| 3)* (positive) | LC-39 | 7.7 |
|  | LC-40 | 8.2 |
|  | LC-41 | 9.4 |
|  | LC-42 | 9.6 |
|  | LC-43 | 10.5 |
| single liquid crystal | LCM02 | −3.07 |
|  | LCM04 | −4.19 |
|  | LCM05 | 4.8 |
|  | LCM07 | −5.1 |
|  | K15 | 11.2 |
|  | E7 | 14.2 |
|  | LCM03 | −3.7 |
|  | LCM06 | 8.8 |

Remarks:
1) Blend of positive liquid crystal component of high dielectric anisotropy and negative liquid crystal component of high dielectric anisotropy.
2) Blend of positive liquid crystal component of high dielectric anisotropy and negative liquid crystal component of low dielectric anisotropy.
3) Blend of positive liquid crystal component of low dielectric anisotropy and negative liquid crystal component of high dielectric anisotropy.

Table IV shows the temperature range of the blue phase of the resultant exemplary liquid crystal compositions of the present invention.

| Blue Phase Liquid Crystal Composition | Temperature Range of Blue Phase (Δ/° C.) |
|---|---|
| LC-1 | 3.5 |
| LC-2 | 3 |
| LC-3 | 2.9 |
| LC-4 | 2.7 |
| LC-5 | 2.5 |
| LC-6 | 1.8 |
| LC-7 | 3.1 |
| LC-8 | 3.3 |
| LC-49 | 3.7 |
| LC-54 | 2.3 |
| LC-55 | 1.9 |
| LC-60 | 6 |
| LC-50 | 4 |
| LC-39 | 2.2 |
| LC-40 | 1.8 |
| LC-41 | 1.7 |
| LC-42 | 1.6 |
| LC-43 | 1 |
| LCM03 | 4.4 |
| LCM04 | 3.6 |
| LCM05 | 2.6 |
| LCM06 | 4.4 |
| LCM07 | 0.4 |

Figure 2:
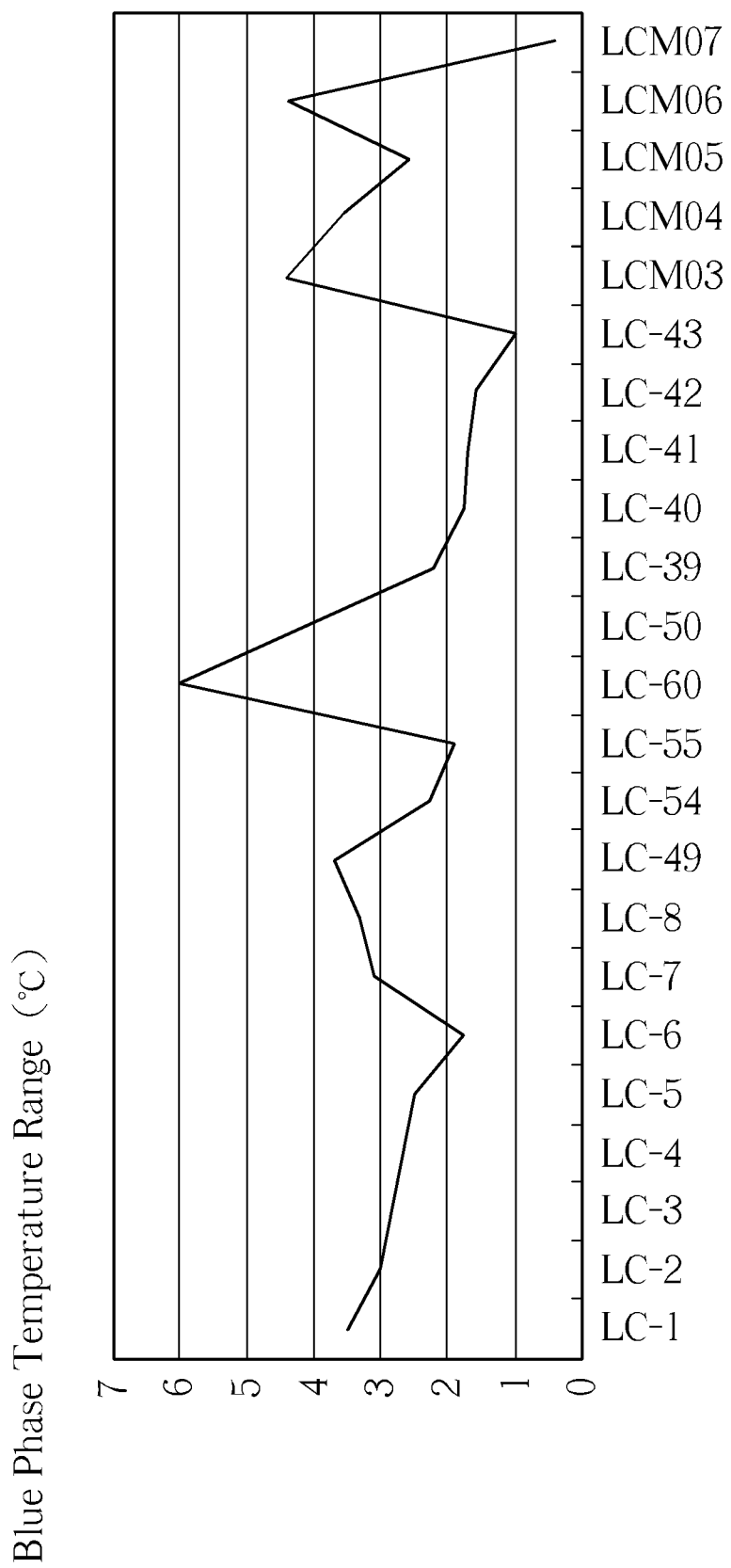
FIG. 2 illustrates the temperature range of the blue phase vs. the resultant exemplary liquid crystal compositions according to an exemplary embodiment of the present invention.

FIG. 2 illustrates the temperature range of the blue phase vs. the resultant exemplary liquid crystal compositions of the present invention.

The following instruments are used to obtain the above-mentioned data.

Digital SLR camera upright microscope: OLYMPUS BX51
Digital SLR camera upright microscope: OLYMPUS E620
Fiber optic spectrometer: Ocean optics USB4000
Thermo system: Mettler Toledo FP90 central processor
Balance: Mettler Toledo XP105
Capacitor measuring system: ALCT III After the above steps, a blue phase liquid crystal composition may be obtained. The blue phase liquid crystal composition of the present invention includes a chiral dopant, a positive liquid crystal component and a negative liquid crystal component. The chiral dopant may have a weight percentage of the total blue phase liquid crystal composition that ranges from 5 to 50. The suitable chiral dopant may be a chiral molecule. There are commercially available products of chiral dopant: ZLI 4572 from Merck, S811 from Uni-Onmard Corp. or R811 from Uni-Onmard Corp. The selected chiral dopant is capable of inducing the liquid crystal blend to generate a blue phase. For example, the resultant blue phase liquid crystal composition has a blue phase temperature range larger than 3° C., or has a blue phase temperature range less than 10° C.

The positive liquid crystal component may have a weight percentage of the total blue phase liquid crystal composition that ranges from 25 to 75. The positive liquid crystal component alone has no blue phase properties with respect to the chiral dopant but has a positive dielectric anisotropy. The positive liquid crystal component has a dielectric anisotropy greater than 0 or between +5 and +15. The positive liquid crystal component may be a single positive liquid crystal or includes multiple positive liquid crystal materials, such as commercially available common positive liquid crystal products so the positive liquid crystal component may include at least one positive liquid crystal material.

The negative liquid crystal component may have a weight percentage of the total blue phase liquid crystal composition that ranges from 25 to 75. The negative liquid crystal component alone has no blue phase properties with respect to the chiral dopant but has a negative dielectric anisotropy. The negative liquid crystal component has a dielectric anisotropy less than −4 or between −4 and −15. The negative liquid crystal component may be a single negative liquid crystal or include multiple negative liquid crystal materials, such as commercially available common negative liquid crystal products so the negative liquid crystal component may include at least one negative liquid crystal material.

There are commercially available liquid crystal products, such as E7, K15, EBBA, MBBA, ZLI4792, MLC 2608, LCT-07-1710 and MJ051989 etc., which may serve as the ingredients for blending. Preferably, the resultant dielectric anisotropy of the liquid crystal composition is as close as possible to 0 but the resultant dielectric anisotropy should never be equal to 0.

In the light of the above experimental results, in one aspect the present invention may utilize the original physical properties (dielectric anisotropy) of the liquid crystal to rapidly formulate a blue phase liquid crystal composition with a wide blue phase temperature range. In another aspect, the present invention provides a guidance to select the ingredients to formulate a blue phase liquid crystal composition with a blue phase temperature range from properly blending a positive liquid crystal component and a negative liquid crystal component which have no blue phase properties with respect to a certain chiral dopant and later by the addition of the selected chiral dopant.

The method of the present invention solves the problems of the current formulation of the blue phase liquid crystals and the adjustments of the operating temperature mainly based on repeated empirical try-and-error without a practical guidance. The approach of the present invention provides a guide to select ingredients to formulate a blue phase liquid crystal composition and does not rely on trying every possible combination or wasting large quantities of materials for blending in search of a suitable formula. This approach can save a lot of time and money and accelerate the developments of the liquid crystal panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for forming a blue phase liquid crystal composition, comprising:
   providing a positive liquid crystal (LC) component comprising at least one positive liquid crystal material, the positive LC component having a positive dielectric anisotropy and no blue phase properties with respect to a chiral dopant;
   providing a negative liquid crystal component comprising at least one negative liquid crystal material, the negative LC component having a negative dielectric anisotropy and no blue phase properties with respect to said chiral dopant;
   blending said positive liquid crystal component and said negative liquid crystal component to form a liquid crystal blend having a dielectric anisotropy between 0.5 and 14; and
   adding said chiral dopant to said liquid crystal blend to form a blue phase liquid crystal composition so that said blue phase liquid crystal composition has a blue phase temperature range larger than 3° C.

2. The method for forming a blue phase liquid crystal composition of claim 1, wherein said positive liquid crystal component has positive dielectric anisotropy greater than +5.

3. The method for forming a blue phase liquid crystal composition of claim 1, wherein the following formula is used to predict said dielectric anisotropy of said liquid crystal blend:

$$\Delta\epsilon_{blend} = A\Delta\epsilon_1 + (1-A)\Delta\epsilon_2$$

wherein
$\Delta\epsilon_{blend}$ is said dielectric anisotropy of said liquid crystal blend,
$\Delta\epsilon_1$ is said dielectric anisotropy of said positive liquid crystal component,
$\Delta\epsilon_2$ is said dielectric anisotropy of said negative liquid crystal component,
A is the relative weight percentage ratio.

4. The method for forming a blue phase liquid crystal composition of claim 1, wherein said negative liquid crystal component has negative dielectric anisotropy less than −4.

5. The method for forming a blue phase liquid crystal composition of claim 1, wherein said dielectric anisotropy of said liquid crystal blend is between +0.61 and +13.6.

6. A blue phase liquid crystal composition, comprising:
   a chiral dopant of 5 to 50 weight percentage; and
   a liquid crystal blend, comprising:
      a positive liquid crystal component of 25 to 75 weight percentage and comprising at least one positive liquid crystal material having a positive dielectric anisotropy and no blue phase properties with respect to a chiral dopant; and
      a negative liquid crystal component of 25 to 75 weight percentage and comprising at least one negative liquid crystal material having a negative dielectric anisotropy and has no blue phase properties with respect to said chiral dopant, wherein said blue phase liquid crystal composition has a dielectric anisotropy between 0.5 and 14 and a blue phase temperature range larger than 3° C.

7. The blue phase liquid crystal composition of claim 6, wherein said positive liquid crystal component has positive dielectric anisotropy greater than +5.

8. The method for forming a blue phase liquid crystal composition of claim 6, wherein the following formula is used to predict said dielectric anisotropy of said liquid crystal blend:

$$\Delta\epsilon_{blend} = A\Delta\epsilon_1 + (1-A)\Delta\epsilon_2$$

wherein
$\Delta\epsilon_{blend}$ is said dielectric anisotropy of said liquid crystal blend,
$\Delta\epsilon_1$ is said dielectric anisotropy of said positive liquid crystal component,
$\Delta\epsilon_2$ is said dielectric anisotropy of said negative liquid crystal component,
A is the relative weight percentage ratio.

9. The blue phase liquid crystal composition of claim 6, wherein said negative liquid crystal component has negative dielectric anisotropy less than −4.

10. The blue phase liquid crystal composition of claim 6, wherein said dielectric anisotropy of said liquid crystal blend is between +0.61 and +13.6.

* * * * *